March 18, 1952     A. H. LAMB     2,589,557
HYGROMETER OF THE WET AND DRY BULB THERMOMETER TYPE
Filed Aug. 19, 1949     2 SHEETS—SHEET 1
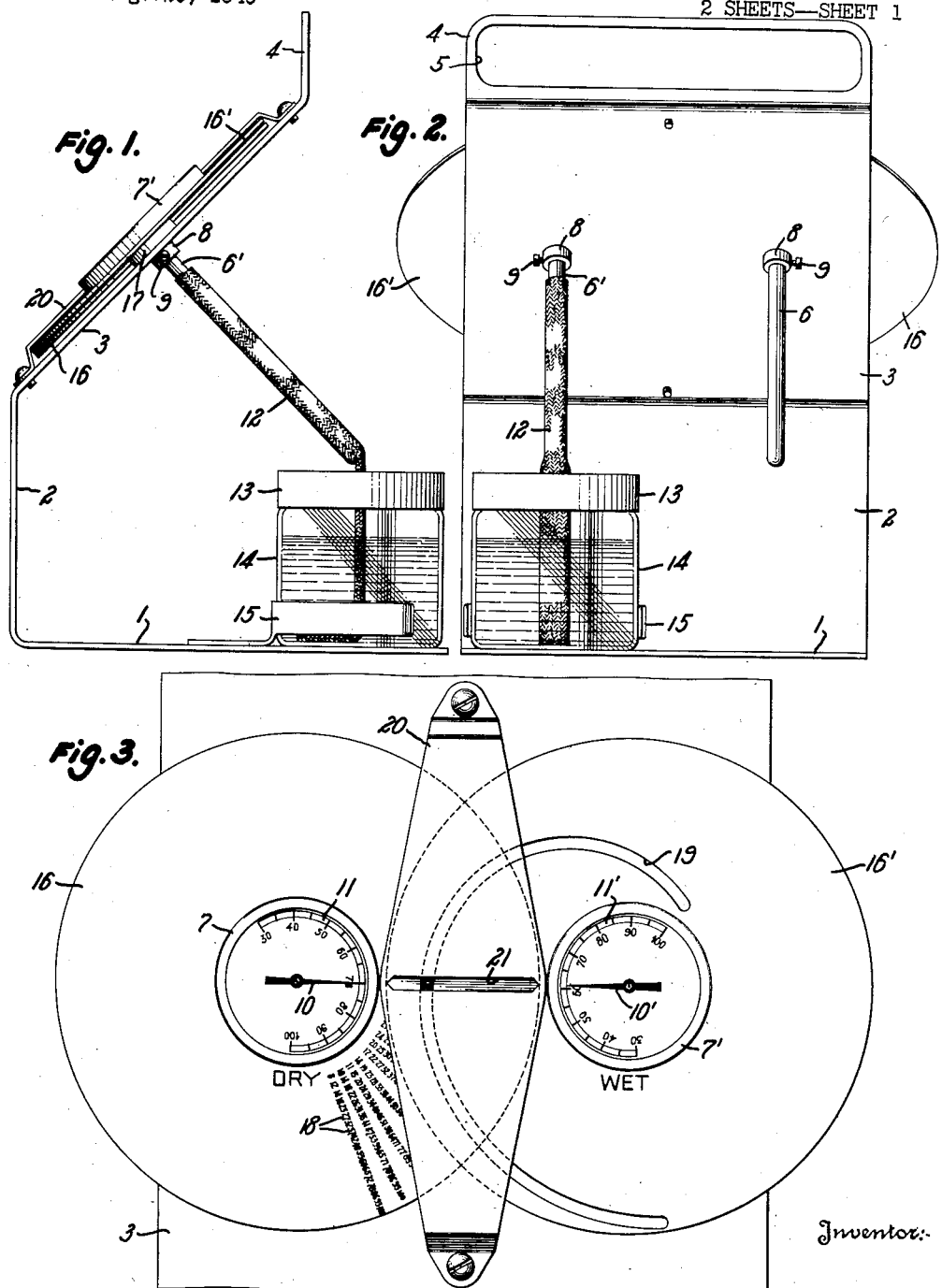
Inventor:-
Anthony H. Lamb,
By Pierce, Scheffler + Parker,
Attorneys.

March 18, 1952   A. H. LAMB   2,589,557
HYGROMETER OF THE WET AND DRY BULB THERMOMETER TYPE
Filed Aug. 29, 1949   2 SHEETS—SHEET 2
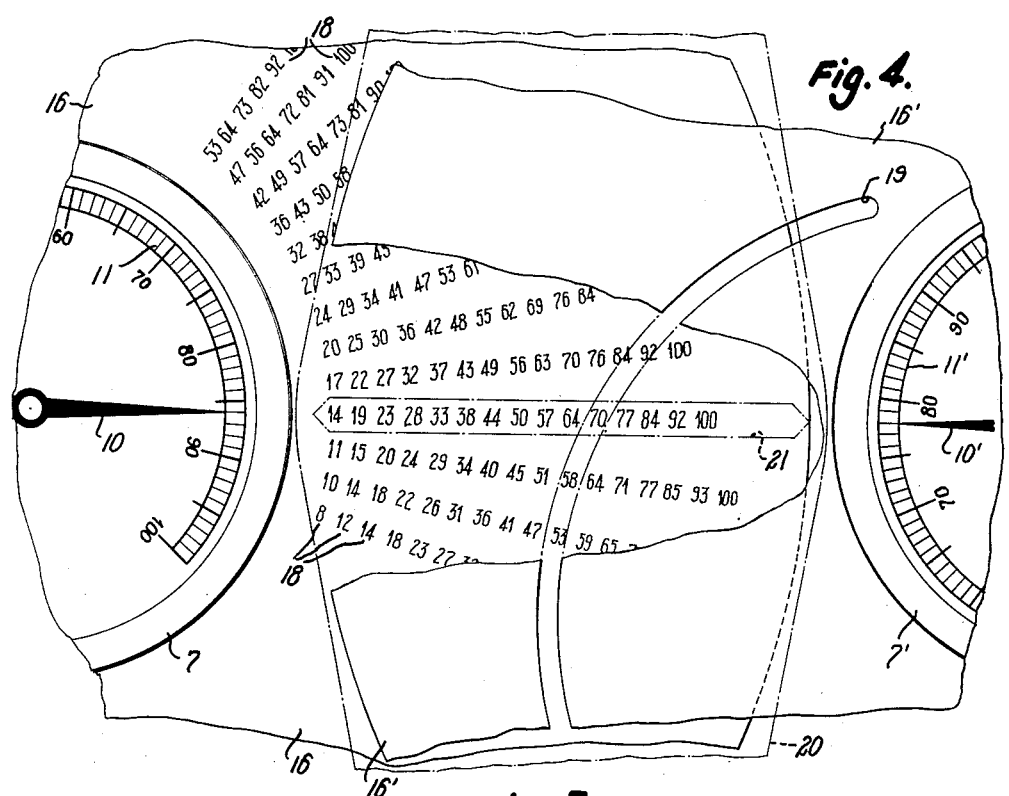
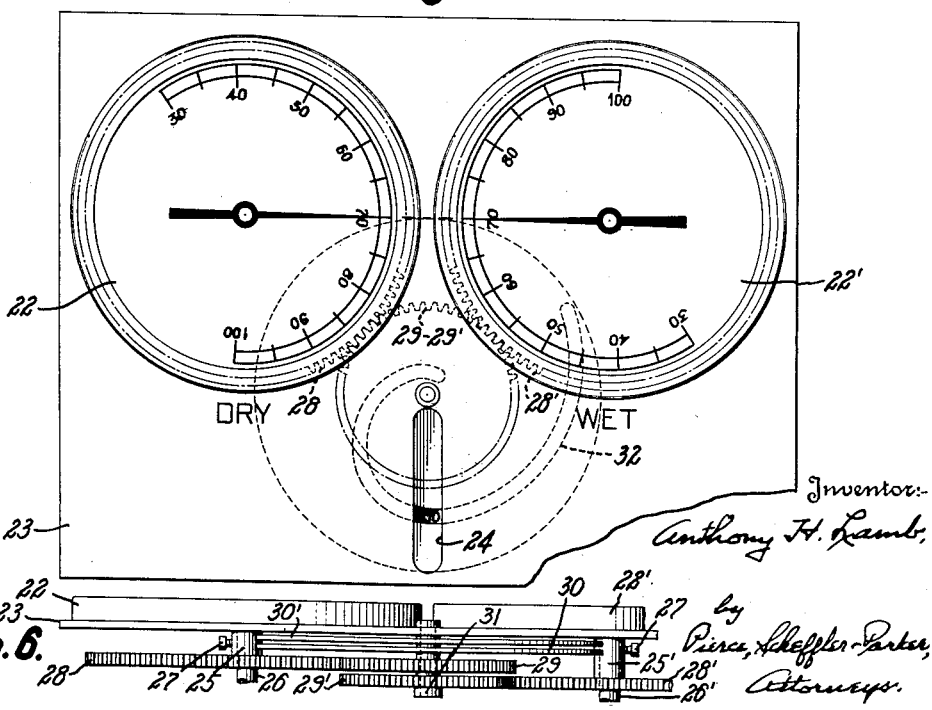

Patented Mar. 18, 1952

UNITED STATES PATENT OFFICE 2,589,557

HYGROMETER OF THE WET AND DRY BULB THERMOMETER TYPE

Anthony H. Lamb, Hillside, N. J., assignor to Weston Electrical Instrument Corporation, Newark, N. J., a corporation of New Jersey Application August 29, 1949, Serial No. 112,923

7 Claims. (Cl. 73—338)

This invention relates to hygrometers of the wet and dry bulb thermometer type and more particularly to hygrometers including computers of relative humidity which are constituted in part by the wet and dry bulb thermometers.

An object of the invention is to provide hygrometers of the wet and dry bulb thermometer type which include computers for determining relative humidity from the measured wet and dry bulb temperatures of the air, and in which the thermometer pointers or other significant temperature-responsive elements are alined to set the computer dials, whereby the possibility of error through the mental transfer of thermometer readings to an independent computer is eliminated. An object is to provide a hygrometer including wet and dry bulb thermometers of bimetallic type and having pointers movable over arcuate scales of temperature graduations, and computer disks carried or displaced by the respective thermometers for determining relative humidity from the indicated wet and dry bulb thermometer temperatures; the computer disks being so graduated and arranged that the relative humidity value is displayed when the thermometers are adjusted to aline the pointers thereof. More specifically, an object is to provide a hygrometer including wet and dry bulb thermometers of bimetallic type supported in proximity upon and angularly adjustable on a base or stand, computer disks connected to and angularly adjustable with the respective thermometers, and cooperating data and fiducial or display elements on said disks for indicating relative humidity values when the thermometers are angularly adjusted to aline the pointers thereof.

These and other objects and the advantages of the invention will be apparent from the following specification when taken with the accompanying drawings in which:

Fig. 1 is a side elevation of a hygrometer embodying the invention;

Fig. 2 is a rear view of the same;

Fig. 3 is a fragmentary front view, on a larger scale, of the hygrometer as seen from above and looking down upon the thermometer casings and associated computer disks;

Fig. 4 is a fragmentary and enlarged front view of the overlapping portions of the computer disks as shown in Fig. 3; and Figs. 5 and 6 are, respectively, a fragmentary front elevation and a fragmentary sectional view of another embodiment of the invention.

In Figs. 1 to 4, the reference numeral 1 identifies the base section of a sheet metal stand having a vertical extension 2, and a rearwardly sloping panel section 3 which terminates in a vertically extending section 4 above substantially the center of gravity of the hygrometer assembly; the section 4 being provided with a hand opening 5 for convenience in carrying the hygrometer. The stems 6, 6' of a dry bulb and a wet bulb thermometer of known bimetallic type extend through openings in the panel section 3 of the stand, and the thermometers are adjustable angularly with respect to the panel but are secured against axial displacement by the thermometer casings or heads 7, 7' in front of panel section 3 and collars 8 which are secured to the stems 6, 6' at the back of the panel section 3 by set screws 9. The thermometers include angularly movable pointers 10, 10' within the respective casings 7, 7' and cooperating with arcuate scales 11, 11' respectively graduated in temperature values. The helical bimetallic coils and staffs for actuating the pointers are not shown within the stems 6, 6' as the specific construction of the thermometers is not an important feature of the invention. A tubular wick 12 is fitted upon the stem 6' of the wet bulb thermometer and extends through the cover 13 of a water jar 14 which is detachably mounted on the base section 1 by a spring clamp 15.

Computer plates or disks 16, 16' are secured to the casings 7, 7' of the respective thermometers and, as shown in Fig. 1, the casing 7' of the wet bulb thermometer is spaced from the panel section 3 by a washer 17 to locate its computer disk 16' above the disk 16 of the dry bulb thermometer. The lower computer disk 16 is provided with a series of concentric rows 18 of relative humidity values, and the upper disk 16' has a curved window opening 19, which may be a slot or a transparent section of an otherwise opaque disk, through which the scales 18 of relative humidity values may be seen. An opaque strip 20 is secured to the panel section 3 to overlie the overlapped portions of computer disks 16, 16', and it has a narrow slot or transparent section 21 in line with the axes of the stems 6, 6' of the thermometers. As shown in Figs. 3 and 4, the slots or transparent sections 19 and 21 of disk 16' and plate 20 aline to display a single relative humidity value of the scales 18, and this value varies with the relative adjustments of the thermometers and the disks 16, 16' secured thereto.

The scales 18 of relative humidity values and the transparent section 19 which constitutes the fiducial mark of the computer are so related that the relative humidity value for any set of dry bulb and wet bulb temperatures is displayed by the computer when the thermometers are adjusted angularly on panel section 3 to aline the respective pointers 10, 10' with each other and with the slot 21 of plate 20.

The illustrated graduations 18 comprise arcuate scales of relative humidity for alternate, even-numbered values of dry bulb temperature, i. e. the outer scale is of relative humidity values for a dry bulb temperature of 92° F., and the next adjacent scale is for 90° dry bulb temperature. Similarly, the window opening 19 of the computer disk 16' is of such width and curvature as to aline accurately with an arcuate scale of graduation 18 only at the even-numbered values of wet bulb temperature. Although no one relative humidity value of scales 18 will be visible through the window openings 19 and 21 when either or both of the wet and dry bulb temperatures do not have even-number values, the relative humidity value may be determined by interpolation between values read from the computer by shifting one or both of the thermometers to turn the pointers 10, 10' slightly out out of exact alinement. For example, for a dry bulb temperature of 87° and a wet bulb temperature of 79°, the adjustment of the thermometers to aline the pointers 10 and 10' will bring portions of four relative humidity values into view through the alined window openings 19 and 21. By turning the thermometers to aline the dry bulb scale mark 86° with the wet bulb scale graduation 78°, as illustrated in Fig. 4, the relative humidity value of 70% is visible through the window opening 19. On adjusting the thermometers to aline the dry bulb temperature graduations for 88° with the wet bulb pointer position for 80° wet bulb temperature the relative humidity value of 71% is displayed on the computer. By interpolation, the relative humidity for a dry bulb temperature of 87° and a wet bulb temperature of 79° lies between 70% and 71%, and may be assumed to be either of these values within an accuracy of plus or minus 1%.

In the embodiment illustrated in Figs. 5 and 6, a dry bulb thermometer 22 and a wet bulb thermometer 22' are supported on a panel 23 for angular adjustment to aline their pointers, and the panel 23 is provided with a slot or transparent window 24. Collars 25, 25' are secured to the stems 26, 26' of the respective thermometers by set screws 27, and the collars have gears 28, 28' respectively fixed thereto. The gears 28, 28' mesh with gears 29, 29' to which computer disks 30, 30' respectively are fixed by telescoped hollow shafts 31. The upper disk 30' is provided with a slot 32 through which relative humidity graduations on the lower disk 30 may be viewed.

The method of operation is the same as that of the first embodiment. When the thermometer casings are turned to aline the pointers, the computer disks are driven through the gear system to display the single relative humidity value corresponding to that set of wet and dry bulb temperatures.

The invention is not limited to the particular embodiments herein shown and described since various changes which may be made in the shape, construction and relative arrangement of the several parts fall within the spirit and scope of the invention as set forth in the following claims.

I claim:

1. A hygrometer of the wet and dry bulb thermometer type, and including bimetallic thermometers supported on a stand for angular adjustment, said thermometers including pointers movable over arcuate scales of temperature graduations, and a computer for determining relative humidity; characterized by the fact that said computer includes a pair of disks connected to said thermometers for angular adjustment thereby, one of said disks carrying a plurality of scales of relative humidity and the other disk carrying a fiducial mark for indicating the then-existing relative humidity value upon adjustment of said thermometers to aline said pointers.

2. A hygrometer as recited in claim 1, wherein said computer disks are coupled through gearing to the respective thermometers for angular adjustment.

3. In a hygrometer of the wet and dry bulb thermometer type, the combination with a pair of bimetallic thermometers which each include an elongated stem and a casing, and an arcuate temperature scale and angularly movable pointer within said casing; of a panel, means supporting said thermometers on said panel for angular movement about the axes of the respective stems, a tubular wick fitted upon the stem of one thermometer, a water container into which the wick extends, and computer means for determining relative humidity from the temperature readings of the respective thermometers; said computer means including a pair of relatively movable computer members carrying respectively a plurality of scales of relative humidity and a fiducial mark, and means connecting said computer members to the respective thermometers for adjustment thereby, said relative humidity scales and said fiducial mark being so related that the fiducial mark indicates the then-existing relative humidity value when the thermometers are adjusted angularly on the panel to locate their pointers in preselected positions.

4. In a hygrometer of the wet and dry bulb thermometer type, the invention as recited in claim 3, wherein said computer members are plates having portions thereof in overlapped relation, the lower plate carrying the scales of relative humidity values, and the upper plate having a window opening, in combination with a third computer member overlying said pair of computer members, said third computer member having a transparent section extending across said window and cooperating therewith to constitute said fiducial mark by restricting the view of the graduated scales of the lower plate substantially to a single value on a single scale.

5. In a hygrometer of the wet and dry bulb thermometer type, the invention as recited in claim 3, wherein said computer elements are angularly adjustable disks.

6. In a hygrometer of the wet and dry bulb thermometer type, the invention as recited in claim 3, wherein said computer elements are angularly adjustable disks secured to the casings of the thermometers.

7. In a hygrometer of the wet and dry bulb thermometer type, the invention as recited in claim 3, wherein said computer elements are angularly adjustable disks supported for rotation about a common axis, and said means connecting said computing members to the respective thermometers includes a gear system for rotation of said computer members by said thermometers.

ANTHONY H. LAMB.

REFERENCES CITED

The following references are of record in the file of this patent:

UNITED STATES PATENTS

| Number | Name | Date |
| --- | --- | --- |
| 1,003,341 | Comfort | Sept. 12, 1911 |
| 1,476,799 | Comfort | Dec. 11, 1923 |
| 1,900,813 | Hill | March 7, 1933 |